(No Model.)
J. O. JOHNSON.
FODDER BUNDLER.
No. 561,994. Patented June 16, 1896.
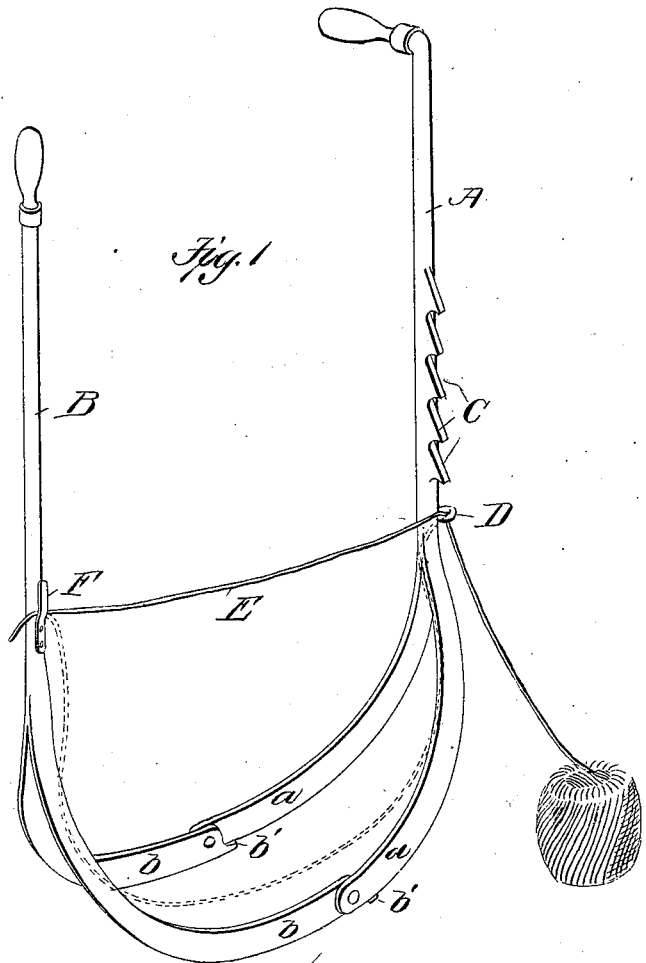
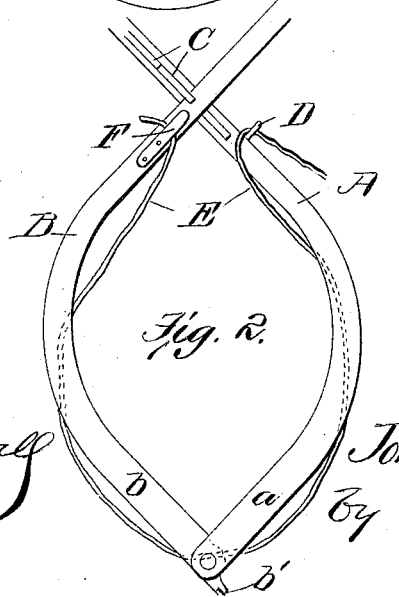
Witnesses:
J. R. Cornwall
Hugh V. Wagner
Inventor
John O. Johnson
By Paul Bakewell
his atty

UNITED STATES PATENT OFFICE.

JOHN O. JOHNSON, OF FESTUS, MISSOURI.

FODDER-BUNDLER.

SPECIFICATION forming part of Letters Patent No. 561,994, dated June 16, 1896.

Application filed January 20, 1896. Serial No. 576,146. (No model.)

*To all whom it may concern:*

Be it known that I, JOHN O. JOHNSON, a citizen of the United States, residing at Festus, in the county of Jefferson, State of Missouri, have invented a certain new and useful Improvement in Fodder-Bundlers, of which the following is a full, clear, and exact description, reference being had to the accompanying drawings, forming part of this specification, wherein—

Figure 1 is a perspective view of my improved fodder-bundler, the same being shown open ready to receive the fodder to be bundled. Fig. 2 is a side elevational view showing the position the parts assume when bundling fodder.

This invention relates to a new and useful improvement in fodder-bundler devices; and it consists, essentially, of two pivoted jaws, the pivot ends of which are bifurcated and flattened so as to render them yielding to a slight extent, so that when the jaws are brought past each other they may be moved to one side slightly. In addition to this one of the jaws is provided with notches, recesses, or teeth with which the other jaw is adapted to engage when the devices are brought together to bundle fodder, so that said jaws may be held in a closed position during the operation of tying or binding the confined fodder. The string is adapted to pass from jaw to jaw, upon which the fodder is adapted to be laid, so that when the jaws are brought together the string surrounds the bundle of confined fodder and its end is brought in such relation to the other portion of the string, which we will term the "other end" of the string, that a knot may easily be formed to confine the fodder within the loop of the string.

In the drawings, A is one member or jaw of my improved bundling device, the upper end of which is preferably formed with a handle, while the lower end is bifurcated and formed with yielding portions $a$, which are preferably flattened. B indicates the other member or jaw having a handle at its upper end, its lower end being bifurcated and preferably formed with flattened yielding portions $b$. The bifurcated ends of these two members are pivoted together, as shown in the drawings, and I prefer to form one or both of said bifurcated ends—that is, either $a$ or $b$, or both $a$ and $b$—with lateral projections $b'$, which extend under the opposite member to form knuckle-joints. In this manner the device is readily portable and will stand alone without any trouble.

C indicates notches, recesses, or teeth formed on one of the members with which the other member is adapted to engage and lock the jaws against opening when the parts are in the position shown in Fig. 2.

D indicates an eyelet on one of the members, through which a cord or twine E is threaded, the end of said cord being secured in a spring-clip F on the other member.

The device is adapted to be carried into the field where corn is being shucked, and at the time of shucking, when the ear is removed from the shuck, the stalk and its leaves and shuck, commonly called "fodder," are placed between the jaws of this device, compressed into as small a bundle as possible, and tied.

The operation of the device is as follows: Assuming the parts to be in the position shown in Fig. 1, fodder being placed upon the string or cord E between the jaws will bear said cord down. When a sufficient amount of fodder has been placed between the jaws, the cord will be in a position shown in dotted lines in Fig. 1. The two members are now brought together and sprung to one side, the portions $a$ and $b$ yielding to this strain. When the axis of the jaws intercept each other, a continued movement will bring the jaw B into engagement with the teeth C, when the jaws will be prevented from separating until it is desired that they should be separated to release the fodder. While the jaws are in this position, as shown in Fig. 2, the end of cord E is removed from clip F and tied to the cord on the other side of the bundle, the cord being preferably drawn as tight as possible around the bundle. The main portion of the cord is now severed between the knot and eye D, the end of the long cord being secured in clip F. The jaws A and B are now sprung to one side to permit disengagement of the jaw B with the teeth C, and the jaws are opened, as shown in Fig. 1, stretching the cord between them. The bundle-fodder which has been tied is removed from beneath the cord E and the cycle of operations above set forth is repeated.

I am aware that many minor changes in the construction, arrangement, and combination of the several parts of my device may be made and substituted for those herein shown and described without in the least departing from the nature and principle of my invention.

Having thus described my invention, what I claim, and desire to secure by Letters Patent, is—

1. A fodder-bundler, comprising two members or jaws having bifurcated yielding ends which are pivoted together, whereby said members may be set in a vertical position, and be supported in that position by the base afforded by the bifurcated ends, and notches, recesses, or teeth on one of said members with which the other member is adapted to engage to hold the jaws in a closed position; substantially as described.

2. The combination with the member B having a clip F mounted thereon, the lower end of said member B being bifurcated and flattened, of a member A having teeth C formed thereon and an eye D, the lower end of said member A being bifurcated and flattened, one or both of said bifurcated members having lateral projections, $b'$, the bifurcated ends of said members being pivoted together; substantially as described.

In testimony whereof I hereunto affix my signature, in presence of two witnesses, this 16th day of January, 1896.

JOHN O. JOHNSON.

Witnesses:
PETER BILLY,
WILLIAM BIESEN.